United States Patent Office 3,746,693
Patented July 17, 1973

3,746,693
SYSTEM AND PROCESS FOR CONTROLLING POLYMERIZATION OF CONDENSATION POLYMERS
Kashmiri L. Gupta, Kingston, Ontario, Canada, assignor to E. I. du Pont de Nemours and Company, Wilmington, Del.
Continuation-in-part of application Ser. No. 768,228, Oct. 17, 1968. This application Feb. 26, 1971, Ser. No. 119,360
Claims priority, application Canada, May 8, 1968, 19,516
Int. Cl. C08g 20/00
U.S. Cl. 260—78 R                  2 Claims

ABSTRACT OF THE DISCLOSURE

The process for preparing a condensation polyamide polymer in a reactor chamber having a heating means and an exhaust vent is controlled by continuously measuring the flow of exhaust fluids from the polymerization process vented from the reactor under high pressure, comparing the flow rate of the exhaust fluids with a predetermined pattern of exhaust fluid flow and regulating the heating means in response to variations between the exhaust fluid flow and the pattern. The apparatus includes a flow measuring device connected to the vent for producing a first signal representing the flow, a time pattern transmitter for producing a second signal representing a predetermined pattern of exhaust flow, a comparator coupled between the flow measuring device and the time pattern transmitter for producing a third signal representing the difference between the first and second signals and a controller for the heating means actuated by the third signal for varying the amount of heat supplied to the reactor chamber.

CROSS-REFERENCE TO RELATED APPLICATION

This application is a continuation-in-part of my copending application Ser. No. 768,228, filed Oct. 17, 1968 and now abandoned.

BACKGROUND OF THE INVENTION

In the process of melt polymerization of fiber-forming condensation polyamides, it is known to carry out the condensation step on a concentrated solution of the reactants in a reactor chamber under high pressure. The reactants, consisting of a salt of a diamine and a dicarboxylic acid, are heated in the presence of water in a closed reactor chamber and the volatile byproducts of the condensation reaction are removed by venting under high pressure.

Such batch processes for the manufacture of polyamides are subject to variations in the number of amine and carboxyl end groups on a batch-to-batch and autoclave-to-autoclave basis. The variations manifest themselves in the form of varying diamine loss resulting in varying end group contents. In order to meet market demands, it is necessary to limit these variations through tighter control over the polymerization process.

SUMMARY OF THE INVENTION

This invention relates to the production of condensation polymers and, more specifically, to an apparatus and process for controlling the preparation of fiber-forming, condensation, polyamide polymers in a high pressure reactor vessel.

An object of the invention is an apparatus control system and a method for controlling condensation polyamide polymerizations.

A further object is a control system and a method for controlling the polymer end-group uniformity of condensation polyamides prepared in different reactor chambers of similar design as well as batch-to-batch uniformity in a single reactor chamber.

With these and other objects in view, there is provided in a reactor chamber for use in the preparation of condensation polymers having a heating means and an exhaust vent, a control system for maintaining the uniformity of the polymer product comprising: a flow measuring device connected to the vent to measure exhaust vent flow with means for producing a first signal representing the flow, a time pattern transmitter for producing a second signal representing a predetermined pattern of exhaust flow, a comparator coupled between said device and said transmitter for comparing said first and second signals and producing a third signal, said third signal representing the difference between said first and second signals and a controller for the heating means actuated by said third signal for varying the amount of heat supplied to the reactor chamber.

There is also provided a process for preparing a condensation polyamide polymer in a reactor chamber having a heating means, the method of controlling the reaction comprising the steps of continually measuring the flow of exhaust fluids from the polymerization process vented from said reactor under high pressure, comparing the flow rate of exhaust fluids with a predetermined pattern of exhaust fluid flow and controlling the heating means in response to any variation between the exhaust fluid flow and the pattern thereby varying the exhaust fluid flow to follow the pattern.

Preferably, there is provided a batch process for the preparation of a polycarbonamide condensation polymer in a closed reactor vessel including the steps of heating an aqueous solution of at least about 50% concentration by weight of a salt of a diamine and a dicarboxylic acid under polymerization temperature and pressure conditions and venting volatile by-products of the heating step from the vessel under high pressure with continued heating to produce a molten, fiber-forming polycarbonamide comprising the steps of: continuously measuring the flow rate of said vented by-products as a function of batch time; comparing the measured flow rate with a predetermined vent flow rate pattern as a function of batch time for producing said molten polycarbonamide under said polymerization conditions; generating a signal proportional to the difference between said measured flow rate and said predetermined vent flow rate pattern; and controlling the heating in response to said signal so that said measured flow rate follows said predetermined vent flow rate pattern within about ±5%, preferably about ±1%, of the rate of the latter at any given time.

Said processes result in improved control over the polymerization resulting in better reproducibility of polymer molecular weight and end-group composition in batch-to-batch and autoclave-to-autoclave processes.

DETAILED DESCRIPTION OF THE PREFERRED EMBODIMENT

Figure 1:
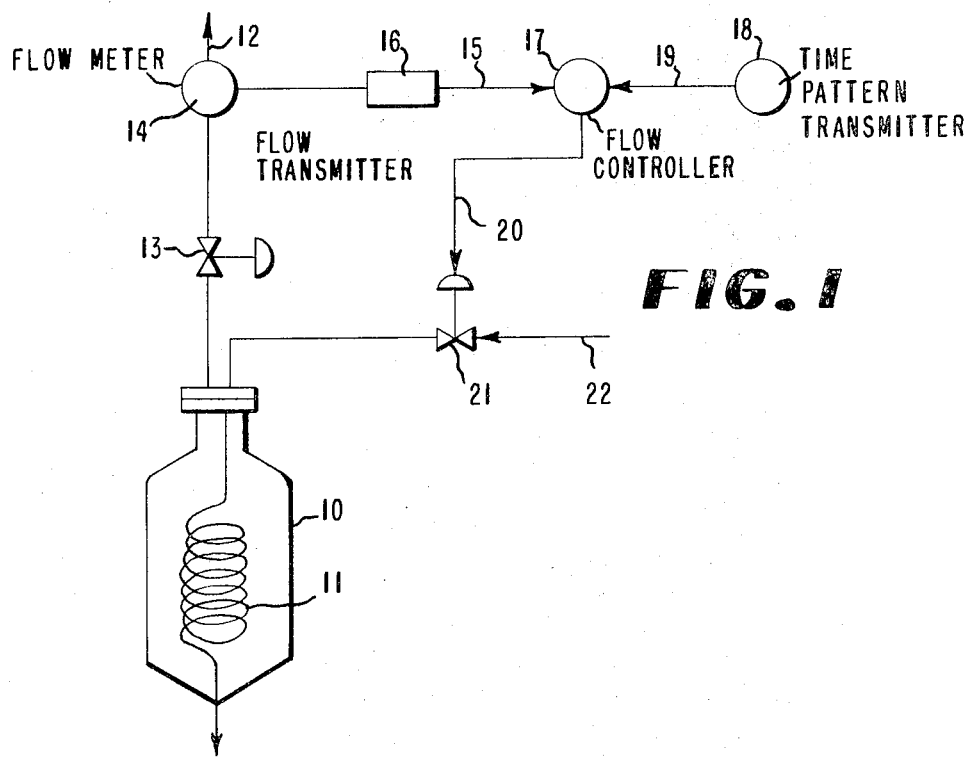
FIG. 1 is a schematic diagram showing one embodiment of the control system of this invention on a closed reactor vessel.

Referring now to FIG. 1, a reactor chamber 10 is shown having a vapor heating coil 11 therein. An exhaust vent line 12 having a reactor chamber pressure control valve 13 is connected to the top of the vessel 10. A flow measuring device 14 is incorporated in the vent line 12 which may be a venturi-type, orifice-type or some other known metering device. A first signal 15 from a flow transmitter 16, connected to the metering device 14, is fed into a vapor heating flow controller 17. A time pattern transmitter 18 is programmed to have a predetermined pattern of the flow through the exhaust vent line 12 against the batch time. This is a predetermined function which changes as the polymerization process is changed. The pattern is derived from both theoretical calculations and results from actual process runs and is inscribed on the time pattern transmitter 18. A second signal 19 from the time pattern transmitter 18 is fed to the flow controller 17.

The flow controller 17 contains a comparator which compares the signal 15 from the flow transmitter 16 with the signal 19 from the time pattern transmitter 18. The flow controller 17 may also contain an integrator to integrate the signal 15 from the flow transmitter 16 for comparison with the cumulative exhaust flow through the vent line 12. The flow controller 17 generates a third signal 20 which is relayed to a flow control valve 21 in the vapor heat supply line 22 to the heating coil 11.

In the preparation of polyhexamethylene adipamide, it has been found that the cumulative amount of water removed from a batch at any instant is a precise indication of the extent of polymerization in the batch at that instant. It has further been observed that the rate at which the steam is vented from the batch process affects the amount of diamine lost. Thus, in order to control the polymerization process and the diamine loss, it is necessary to control the vent rate and cumulative water loss as a function of time.

In operation, the instantaneous exhaust flow rate from the reactor chamber 10 is measured by the flow metering device 14. The flow rate is compared with the set point on the predetermined pattern from the time pattern transmitter 18 by the comparator in the flow controller 17. The error signal thus generated is used to control the flow of vapor heat to the heating coil 11. By this method, the exhaust flow rate from the reactor chamber 10 is made to follow the predetermined pattern of the flow through the exhaust vent line 12 against the batch time.

Condensation polycarbonamide polymers and copolymers prepared by the melt polymerization of the corresponding ammonium salts as disclosed in U.S. Pat. No. 2,163,636 are most suited for preparation according to the process of this invention.

Figure 2:
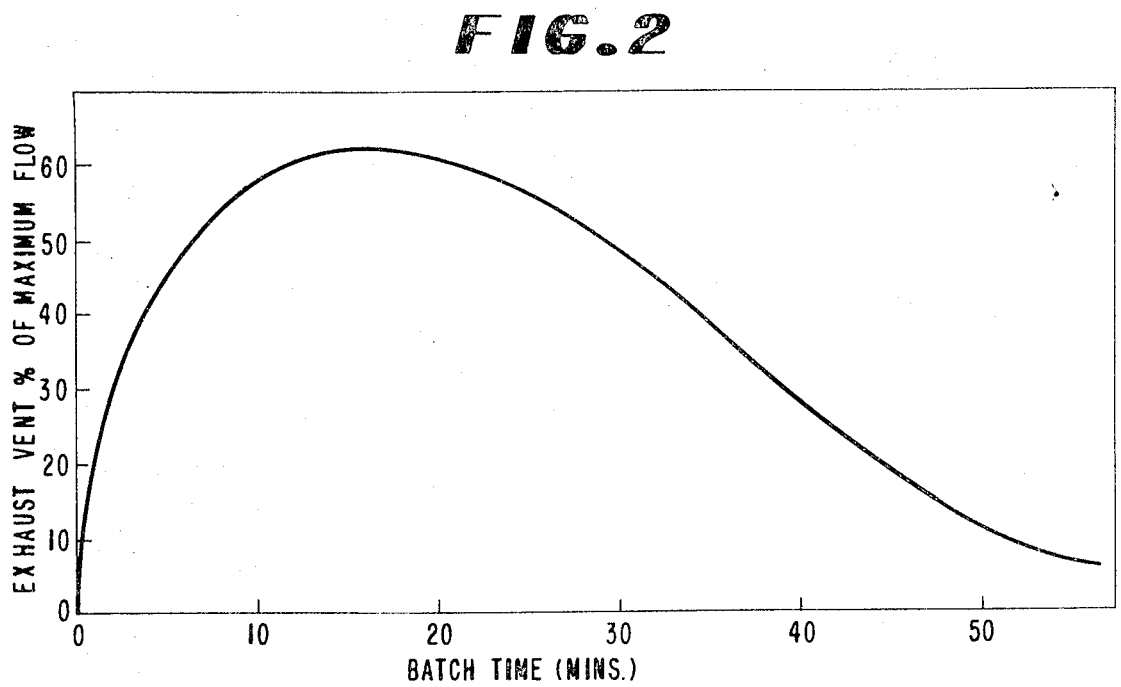
FIG. 2 is a typical graph of the exhaust vent percentage of maximum flow against batch time for polyhexamethylene adipamide.

Preferably, the flow measuring device should be located upstream of the vent valve 13 so that the flow is measured under the constant pressure of the vessel upon the initiation of the venting step. As disclosed in U.S. Pat. No. 2,163,636, a high polymerization pressure (for example, 250 p.s.i.g. for 66-nylon) is used to increase the polymerization temperature for faster reaction. The pressure initially increases as the temperature of the reactants increases in the closed vessel. Upon initiation of the venting step and boiling of the reactants, the polymerization temperature at the fixed pressure will continue to increase as heat is added to the reactants and water is removed. The polymerization temperature will typically increase from 175° C. to 250° C. during the venting cycle for 66-nylon at 250 p.s.i.g. The predetermined vent flow pattern is limited on the maximum side by the particular equipment's ability to supply heat to the batch. Due to heat transfer effects and changing water content, a characteristic curve as shown in FIG. 2 will reach a peak and eventually approach zero when substantially all water is removed. The predetermined vent flow pattern is established for a particular designed vessel and process by experimentally controlling the heat source so that the need for the maximum quantity of heat available is never exceeded. Different equipment design or batch size change both the time axis and vent flow axis for the appropriate pattern.

EXAMPLE I

A vent flow rate pattern for the polymerization of 66-nylon salt of hexamethylene diamine and adipic acid in an autoclave is theoretically calculated from known, operating, polymerization cycle experience and then experimentally verified. The experiment is carried out using open loop control such that the heating requirements are always below the quantity available. An apparatus of the type shown in FIG. 1 is employed. The vent flow rate is measured as a function of time by monitoring the flow meter. A vent flow rate control function is derived from an average curve showing vent rate versus cumulative water loss. The type of function is shown in FIG. 2 for venting of the autoclave after the pressure has reached 250 p.s.i.g. The data is plotted as a function of time on a device used to transmit a flow rate pattern (time pattern transmitter 18).

This predetermined vent flow rate pattern is used in a process control system as described in FIG. 1 to prepare a fiber-forming polycarbonamide of hexamethylene diamine and adipic acid by feeding a solution of said salt in water (82% by weight) at a temperature of 152° C. and under a pressure of 150–180 p.s.i.g. into the autoclave. The reactants are heated and the pressure gradually rises over a period of time of about 16 minutes to 250 p.s.i.g. with the vent valve being closed. As soon as the pressure reaches 250 p.s.i.g., venting is initiated while controlling the vent rate according to the pattern The vent rate is controlled within ±5% of the predetermined pattern for 45 minutes, during which period most of the diamine losses during polymerization occur. Pressure is maintained at 250 p.s.i.g. during this cycle until a temperature of 236° C. is reached. Upon reaching this temperature, the autoclave pressure is allowed to decrease slowly, while maintaining the temperature, to atmospheric pressure using a normal open loop cycle which drops the pressure in about 65 minutes. The polymer is held for 15 minutes under substantially atmospheric pressure and is then extruded, quenched and cut into flake. A polymer of the desired predetermined molecular weight and composition is obtained.

The procedure can be used still more effectively by using an on-line computer generating the heat controlling function depending upon the total error in the vent pattern made up to a particular instant in the polymerization.

EXAMPLE II

Thirty-three regular batches of poly(hexamethylene adipamide) are prepared from hexamethylene diammonium adipate consecutively in an autoclave by the process having a vent control system of the type described in Example I. Measurement of relative viscosity, number of amine ends and carboxyl ends were recorded for each batch and the standard deviation about a mean value calculated. These results are shown in Table 1 compared with results of batches prepared in an autoclave having the normal open loop control.

TABLE 1

| Control mode | Standard deviation about mean value | | |
|---|---|---|---|
| | Amine ends | Carboxyl ends | Relative viscosity |
| Vent control | 43.03±0.328 | 92.57±0.876 | 38.33±0.446 |
| Open-loop control | 44.182±0.769 | 93.28±1.362 | 37.95±0.708 |

The results show the vent control system produces batches having a greatly improved deviation about a mean value than the open-loop control system. Dyeing tests have been carried out on fabric prepared from several batches of nylon produced by the vent control system which indicate a significant improvement in dyeing uniformity.

What is claimed is:

1. In a batch process for the preparation of a polycarbonamide condensation polymer in a closed reactor vessel that includes the steps of heating an aqueous solution of at least about 50 percent concentration by weight of a salt of a diamine and a dicarboxylic acid under polymerization temperature and pressure conditions and venting volatile by-products of the heating step from the vessel under continued heating to produce a molten, fiber-forming polycarbonamide, a method of controlling the process comprising: continuously measuring the flow rate of the vented by-products as a function of batch time; comparing the measured flow rate with a predetermined vent flow rate pattern as a function of batch time for producing said polycarbonamide polymer under said polymerization conditions; generating a signal proportional to the difference between said measured flow rate and said predetermined vent flow rate pattern; and controlling the heating step in response to said signal so that said measured flow rate follows said predetermined vent flow rate pattern within about five percent of the pattern rate of any given point in batch time.

2. The process as defined in claim 1, said measured flow rate following said predetermined vent flow rate pattern within about one percent of the pattern rate at any given point in batch time.

References Cited

UNITED STATES PATENTS

| 2,163,584 | 6/1939 | Carothers | 260—78 R |
| 3,206,449 | 9/1965 | Van Luir | 260—95 R |
| 3,357,955 | 12/1967 | Bryan | 260—78 R |
| 3,476,713 | 11/1969 | Dorsey | 260—78 R |

HAROLD D. ANDERSON, Primary Examiner

U.S. Cl. X.R.

260—95 R; 425—143